Jan. 16, 1968   A. C. GARY   3,363,600
SIGNAL DEVICE
Filed Oct. 19, 1965   3 Sheets-Sheet 2
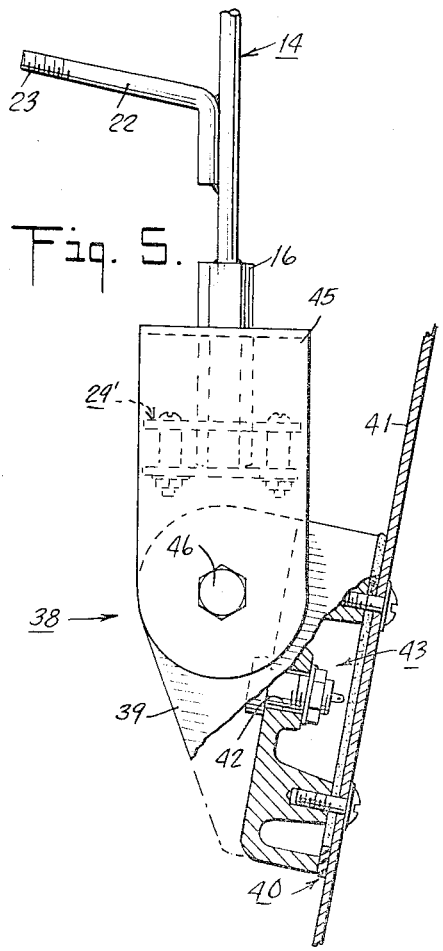
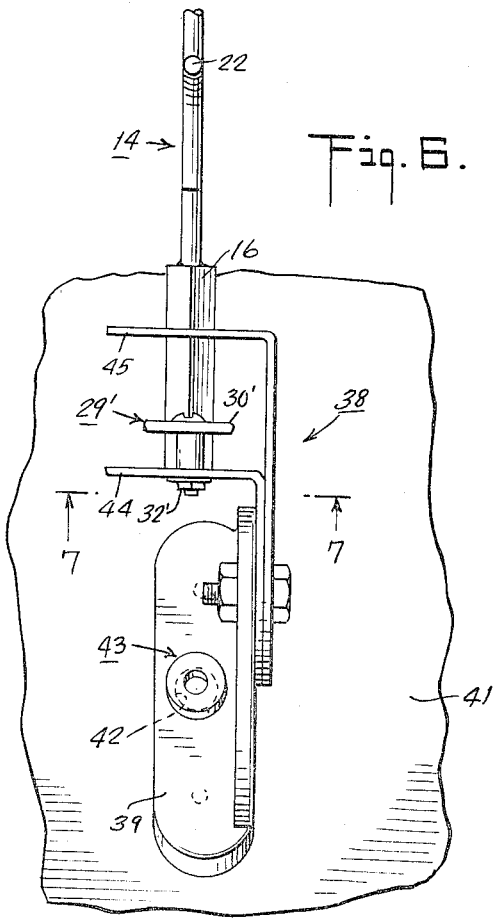
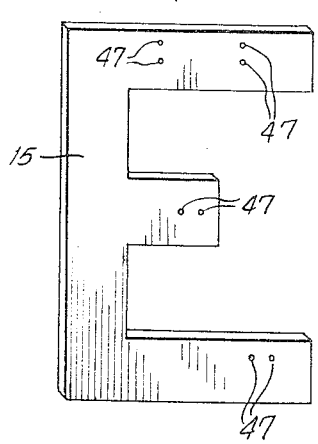
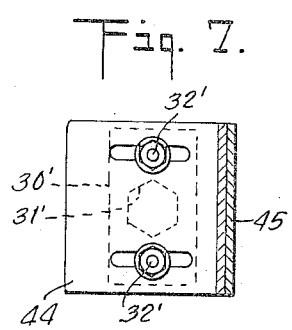
INVENTOR.
ALVIN C. GARY
BY
Kenyon & Kenyon
ATTORNEYS

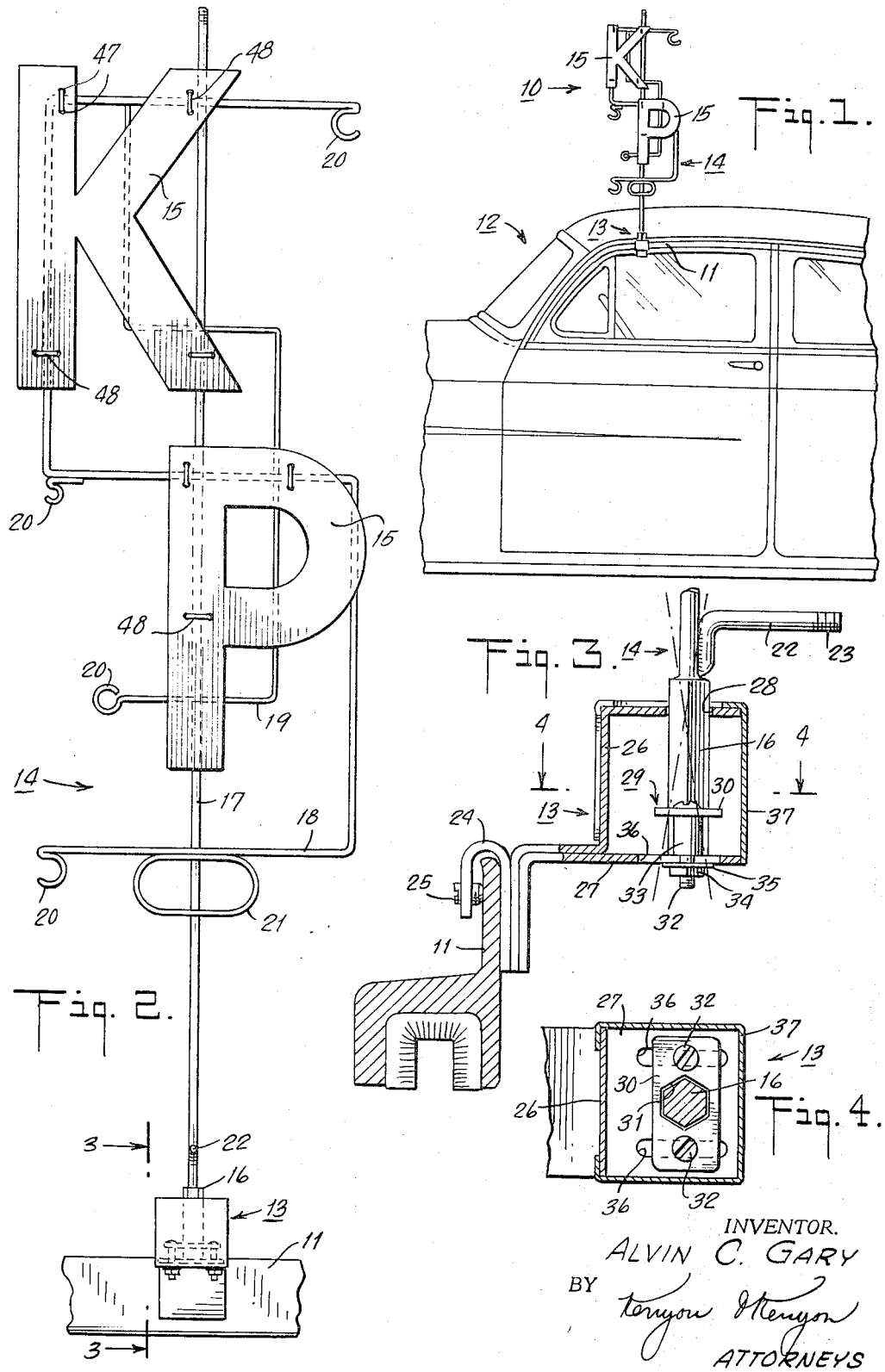

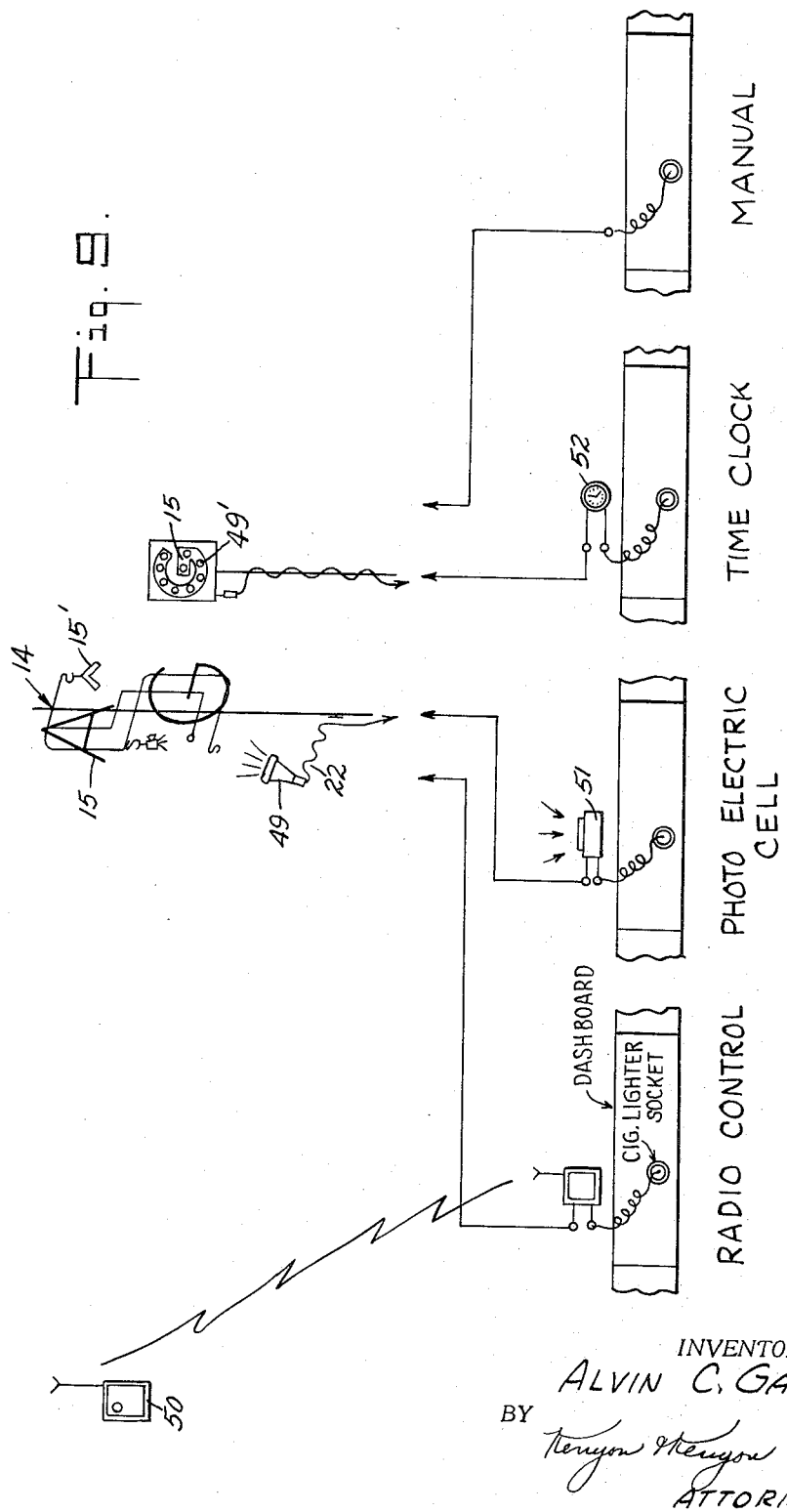

United States Patent Office 3,363,600
Patented Jan. 16, 1968

3,363,600
SIGNAL DEVICE
Alvin C. Gary, 378 W. Palisade Ave.,
Englewood, N.J. 07631
Filed Oct. 19, 1965, Ser. No. 497,908
12 Claims. (Cl. 116—28)

ABSTRACT OF THE DISCLOSURE

A signal device for vehicles having a holster and a wire frame removably mounted in one of a number of positions in the holster. A frame receiving plate is adjustably secured within the interior of the holster to receive the base of the wire frame and to position the inclination of the wire frame in one of a number of angles.

---

The invention relates to a signal device. More particularly, the invention relates to a signal device for vehicles such as automobiles and small water craft.

Because of the extensive use of the automobile in today's mechanized society as well as the expanded numbers of automobiles in operation, a problem in relocating a parked automobile arises whenever one parks his automobile in a parking lot facility. It is not uncommon to find that a great amount of time is spent in trying to relocate one's car after it has been parked among a great number of other cars. This is especially true where a parking lot facility has no designation for various parking areas. The relocation problem is not only present in large parking lot facilities, such as, at ballparks and beaches, but also in small facilities, such as, corner-size parking lots where automobiles are often parked without any well defined arrangement. The problem is further compounded when an automobile which has been parked in the daytime is sought for at nighttime.

It is therefore an object of the invention to provide a signal device which projects above a vehicle to enable one to quickly relocate the same.

It is another object of the invention to provide a signal device which enables one to quickly and easily relocate a parked automobile in a large parking lot facility.

It is another object of the invention to provide a parked automobile with a signal device which enables one to relocate the automobile in the nighttime. It is another object of the invention to provide a signal device for a parked automobile which is adjustable for a plurality of positions for sighting of the signal device.

It is another object of the invention to provide a signal device for relocating a parked automobile which is removable when not in use.

It is another object of the invention to provide a signal device for relocating a parked automobile with any combination of mountable alphabetical letter cut-outs, and other embellishments.

It is another object of the invention to provide a signal device for relocating a parked automobile which is simple to use and inexpensive to manufacture.

Generally, the invention provides a signal device for vehicles, such as, automobiles, small water craft, pick-up trucks, etc. The signal device consists of a holster means and a wire frame means which is removably supported in the holster means. The holster means is secured to the frame of a vehicle in any suitable position and includes a movable wire frame receiving means therein for adjusting the angle of the wire frame means relative to the vehicle and for orientating the wire frame means relative to a desired line of sight. The wire frame means is provided with a suitably shaped base for reception in the receiving means and is constructed to display an identifying means such as any combination of at least a pair of alphabetical letter cut-outs and any other embellishments at strategic locations.

The holster means is of a type which is either demountably secured to the frame of a vehicle or permanently secured to the frame especially when used on automobiles not having a complete door frame around a window.

The wire frame means can also be provided with a suitable light bracket for mounting a suitable light source on the wire frame means for nighttime or foul weather use. The light source in such a case is activated by any suitable control system which may be actuated from inside or outside the vehicle and is directed to illuminate the mounted cut-outs and embellishments for attracting one's visual attention.

The alphabetical letter cut-outs are standardized for mounting in strategic locations on the wire frame means by being provided with at least two sets of holes through which suitable clamping means can be inserted to secure the cut-outs to the wire frame means.

These and other objects of the invention will become more apparent from the following detailed description and appended claims when taken in conjunction with the accompanying drawings in which:

FIG. 1 illustrates a fragmentary elevational view of a vehicle having a signal device in accordance with the invention secured to the door frame thereof;

FIG. 2 illustrates an enlarged view of the wire frame means and alphabetical cut-outs shown in FIG. 1;

FIG. 3 illustrates a view of the holster means taken at line 3—3 of FIG. 2;

FIG. 4 illustrates a view taken at line 4—4 of FIG. 3;

FIG. 5 illustrates a modified holster means of the invention secured permanently to an automobile frame;

FIG. 6 illustrates a view of the holster means shown in FIG. 5;

FIG. 7 illustrates a view taken at line 7—7 of FIG. 6;

FIG. 8 illustrates a view of an alphabetical cut-out made in accordance with the invention; and FIG. 9 illustrates a schematic view of a number of light control systems for illuminating the signal device.

Referring to FIG. 1, the signal device 10 is secured to the door frame 11 on the driver's side of an automobile 12; however, the signal device can be secured to any door frame of the automobile or to the frame of a boat. The signal device 10 is comprised of a holster means 13 secured to the door frame 11 and a wire frame means 14 positioned and removably supported in the holster means 13. When the automobile is parked, the wire frame means 14 is orientated to be in alignment with the expected line of sight of the owner when he returns to relocate the parked automobile and inserted into the holster means. As shown, the wire frame means 14 is provided with an identifying means such as a pair of alphabetical letter cut-outs 15 which are selected to identify the owner's automobile and which are of sufficient size to be seen by persons of normal vision at a distance of approximately 300 feet. However, provision may be made for additional letter cut-out to further identify the owner's automobile.

Referring to FIG. 2 the wire frame means 14 is formed of an enlarged polygonal-shaped base 16, for example, a hexagonal shape, and a series of wires mounted on the base 16. The base 16 and holster 13 can be provided with any suitable releasable locking means which can be activated from within the automobile to retain the wire frame means 14 within the holster 13 after it has been inserted therein.

The wires, for example, are a straight vertical wire 17, a block S-shaped wire 18 secured at their points to the vertical wire 17, and an interior wire 19 having two vertical legs and two horizontal legs and which is secured at two points to the vertical wire 17 and at two points to the wire 18. The wires of the frame means 14 are further made of different diameters, the largest diameter wire being the vertical wire. This allows the wire frame means 14 to be of reduced weight while preserving its overall strength and rigidity. The wire frame means is also formed with a plurality of embellishment hooks 20 which are located at strategic points, such as the ends of the wires 18 and 19 and intermediate corners of the wire 18, and which are adapted to support embellishments therefrom. The term "embellishments" means novelty devices such as miniature models of boats, fishing rods, T-squares, books, or any symbol which further identifies the automobile owner, as by his vocation or avocation.

The wire frame means 14 is also provided with a finger grip 21 which is secured thereon below the wire 18 and which is formed, for example, of an oval shaped wire ring. Further, the wire frame means 14 is provided with a wire light mounting bracket 22 near the base of the vertical wire 17 for mounting a suitable light source. The bracket 22 is made of an L-shaped wire with a threaded free end 23.

Referring to FIGS. 3 and 4, the holster means 13 is formed with a suitable bracket 24 which fits over the door frame 11 of the automobile 12 and which secures the holster means to the door frame 11 by a suitable pressure applying means 25, such as, a threaded headless screw. Further, the holster means 13 is formed with a pair of plates 26, 27 which are secured to the bracket 24 and which are shaped to define a space between the free ends thereof. The upper plate 26 is formed with a polygonal-shaped aperture 28 which is complementary to the shape of the base 16 of the wire frame means 14. The lower plate 27 mounts a wire frame receiving means 29 thereon which is comprised of a flat plate 30 having a polygonal-shaped frame means orientating aperture 31 at a central location which is complementary to and in alignment with aperture 28, and a pair of suitable vertical mounting elements which position the flat plate 30 above the plane of the lower plate 27. Each mounting element is composed of a threaded screw 32, a sleeve 33 through which the screw 32 passes and a nut 34 which is threaded on the screw against suitable washers 35 and the lower plate 27 to fix the screw in position. The screws 32 of the mounting elements are mounted in suitable elongated slots 36 in the lower plate 27 so that the frame receiving means 29 can be horizontally adjusted to align the wire frame means 14 in a vertical plane where a particular door frame 11 is offset from a vertical plane. The angular extent of the axis of the wire frame means 14 relative to the holster means 13 for such situations is shown by the phantom lines in FIG. 3.

In order to utilize the signal device once the automobile is parked, the wire frame means 14 which is usually transported in a suitable storage area of the automobile is inserted into the holster means 13 through the apertures in the upper plate 26 and receiving means 29 until it comes to rest on the lower plate 27. Depending on the angle of the wire frame means 14, the receiving means 29 is shifted horizontally to bring the wire frame means into vertical position and the nuts 34 are tightened against the lower plate 27. It is to be noted that once a position for the receiving means 29 is established, there is no need to change it. Accordingly, the position of the receiving means 29 can be fixed either by a manufacturer for a particular style automobile or by the automobile owner as desired.

Further, in positioning the wire frame means 14 in the holster means 13, the base 16 is so aligned with the apertures 28, 31 that the cut-outs 15 on the device 10 are orientated to be substantially perpendicular to the expected line of sight of the driver when he returns to relocate the parked automobile. The complementary shapes of the base and apertures prevent any rotation of the frame means 14 once it is orientated.

In order to protect the receiving means 29 from the weather, a suitable three-sided cover 37 is positioned over the upper plate 26 and forms a chamber with the wall of plate 26 to enclose the space between the plates 26, 27. Any water or fluid which thereafter enters the chamber will be led out through the elongated slots 36.

Referring to FIGS. 5, 6 and 7, the holster means can be secured permanently to the frame of an automobile. In this modification, the holster means 38 is formed with a mounting bracket 39 which is secured at its underside against a suitable gasket 40 to the frame 41 of an automobile and affixes the holster means 38 thereto. The mounting bracket 39 is formed with a suitable passage 42 in which a suitable current conducting socket 43, such as, an insulated female jack, is inserted so that current generated from within the automobile can be conducted to a suitable light source mounted on the light mounting bracket 22. The holster means 38 is also formed with a pair of plates 44, 45 which are pivotally mounted on the bracket 39 by means of a suitable pivot 46, such as, a screw and nut assembly. The plates 44, 45 form a space between the free ends thereof which is similar in configuration to the space formed by plates 26, 27 of the above described holster means 13. In addition, the holster means 38 mounts a wire frame receiving means 29' which is identical to the above described receiving means 29 and is provided with identical apertures as identified by primed characters in the drawings.

The signal device shown in FIGS. 5, 6 and 7 is utilized and covered in the same manner as the signal device illustrated in FIGS. 1 to 4, except that the device is permanently fixed in place and is pivotal in a direction transverse to the elongated slots 36' to further align the wire frame means 14 in a vertical position.

Referring to FIG. 8, each letter cut-out which is used for identification purposes with the signal devices is provided with a number of sets of holes 47, each set having at least two holes. For example, the letter "E" has 4 sets of two holes formed therein at particular points. The sets of holes correspond to the position of a wire of the wire frame means 14 when the letter cut-out is in either of two positions relative to the frame means, one position being at an upper portion of the frame means and the other being at a lower portion. Thus, by inserting a suitable clamping means 48, such as, a wire or staple, through each set of holes 47, the cut-out is rigidly secured to the frame means 14. It is noted that in some letter cut-outs it is not possible to use 4 sets of holes, thus, some letter cut-outs will have five, three or two sets of holes with some of the sets having three holes. Further, in order to be more attractive, the cut-outs 15 can be coated with an irridescent material or light reflective material.

Referring to FIG. 9, when the signal device is to be used in the nighttime or in foul weather, a light source 49 is secured to the mounting bracket 22 and directed towards the wire frame means 14 to illuminate the cut-outs 15 and embellishments 15' thereon. In order to provide a suitable power source or switch for the light source, a number of control systems can be utilized. For example, as illustrated, a radio control can be plugged into the cigarette lighter socket on the dashboard of the automobile and activated through a single switch 50 located a distance from the automobile. Also a photo-electric cell 51 which is actuated by a decrease in intensity of light can be plugged into the lighter socket. Thus, when twilight or darkness arrives, the cell 51 will cause the power supply of the automobile to energize the light source 49. Similarly, a timing device 52 can be used to activate a light source 49' which is composed of a series of small light bulbs spaced around the cut-out 15. Finally, the light source 49 can be activated by a simple manual switch interposed in a power supply line into the light socket. In all of these cases, the necessary energizing wires can be passed through the window frame of the automobile or into the current conducting socket 43 in the bracket 39 of the permanent-type holster means 38.

While the signal device is readily adapted for use with vehicles, it may also be used in the nighttime or in foul weather on private docking piers to relocate the same upon return of a small water craft thereto. In such a use, the light source 49 which can also incorporate a horn or similar device therewith may be activated by a radio control or photo-electric cell above described.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A signal device for a vehicle comprising
   a wire frame means having a base at one end thereof and identifying means secured thereon; and
   a holster means removably mounting said wire frame means therein, said holster means including a mounting bracket for securement to a vehicle, a pair of plates secured to said mounting bracket to define a space therebetween, one of said pair of plates having a first aperture therein receiving said base, and receiving means adjustably mounted on the other of said pair of plates between said pair of plates, said receiving means having a second aperture between said plates receiving said base whereby the angle of said wire frame means relative to said pair of plates and the automobile is adjusted upon adjustment of said receiving means relative to said other of said pair of plates.

2. A signal device as set forth in claim 1 wherein said wire frame means has a series of wires including a vertical wire mounted on said base, a block S-shaped wire secured to said vertical wire and an interior wire secured at two points to said vertical wire and at two points to said block S-shaped wire.

3. A signal device as set forth in claim 2 wherein said wire frame further includes embellishment hooks at strategic points on said wires for supporting embellishments therefrom.

4. A signal device as set forth in claim 1 wherein said identifying means includes at least a pair of alphabetical letter cut-outs, each of said cut-outs having at least two sets of holes therein corresponding to a position on said wire frame means and removable clamping means passing through the holes in said cut-outs securing said cut-outs to said wire frame means.

5. A signal device as set forth in claim 1 which further comprises a light source mounted on said wire frame means for illuminating said identifying means.

6. A signal device as set forth in claim 5 wherein a control system is operably connected to said light source for activating said light source.

7. A signal device as set forth in claim 1 wherein said pair of plates is pivotally secured on said mounting bracket for adjusting said plates relative to said mounting bracket whereby said holster can be permanently secured to the automobile.

8. A signal device as set forth in claim 1 wherein said receiving means includes a third plate positioned between said pair of plates and having said second aperture therein and means secured to said third plate and adjustably secured to the other of said pair of plates for adjusting said third plate relative to said other of said pair of plates.

9. A signal device as set forth in claim 8 wherein said base has a polygonal shape in cross section and at least one of the apertures in said one of said pair of plates and said third plate is complementary to the shape of said base to position said base in one of a number of positions in said holster means whereby said wire frame means is oriented relative to a desired line of sight.

10. A holster means for mounting a base of a wire frame therein comprising
    a mounting bracket;
    a pair of plates secured to said mounting bracket in fixed relation to each other to define a space therebetween, one of said pair of plates having an aperture therein for receiving the base the other of said plates having a surface for supporting a base thereon and at least one elongated slot formed therein;
    a third plate disposed in spaced relation between each of said pair of plates, said third plate having an aperture therein for receiving the base; and
    means secured to said third plate and adjustably secured to the other of said pair of plates within said slot for adjusting said third plate relative to said other of said pair of plates whereby the angle of inclination of a received base relative to said pair of plates is adjusted upon adjustment of said third plate relative to said other of said pair of plates.

11. A holster means as set forth in claim 10 wherein at least one of the apertures in said one of said pair of plates and said third plate is polygonal in shape and complementary to a received base.

12. A holster means as set forth in claim 10 wherein said pair of plates is pivotally secured to said mounting bracket for adjusting said plates relative to said mounting bracket.

References Cited

UNITED STATES PATENTS

| | | | |
|---|---|---|---|
| 2,749,067 | 6/1956 | Gorenflo | 248—314 |
| 2,891,195 | 6/1959 | Smyth | 340—81 |
| 2,922,152 | 1/1960 | Del Conte | 340—84 |
| 2,937,362 | 5/1960 | Hartnett | 116—28 |
| 3,000,599 | 9/1961 | Honig | 248—38 |
| 3,046,494 | 7/1962 | Root | 340—81 |
| 3,091,421 | 5/1963 | Wolbers | 248—41 |
| 3,142,038 | 7/1964 | Jackson | 340—84 |
| 3,178,139 | 4/1965 | McFarlin | 248—43 |
| 3,191,898 | 6/1965 | McCullough | 248—299 |
| 3,239,957 | 3/1966 | Snediker | 40—129 |
| 416,755 | 12/1889 | Schoenike | 248—41 |
| 417,997 | 12/1889 | Dupuis | 248—40 |
| 521,619 | 6/1894 | Jordan | 248—40 |
| 1,162,608 | 11/1915 | Hohl et al. | 248—41 |
| 1,505,290 | 8/1924 | Scanlan | 40—125 |
| 1,975,347 | 10/1934 | Browning | 200—38 |
| 2,100,657 | 11/1937 | Edwards | 200—16 |
| 2,168,602 | 8/1939 | Hassan | 340—87 |
| 2,360,248 | 10/1944 | Mace | 343—882 |
| 2,584,292 | 2/1952 | Rodgers | 340—84 |
| 2,641,752 | 6/1953 | Naymik | 240—8.18 |

LOUIS J. CAPOZI, *Primary Examiner.*